United States Patent [19]
Hudkins

[11] 3,988,853
[45] Nov. 2, 1976

[54] GAME BAG FOR DIVERS
[76] Inventor: Philip George Hudkins, 350 San Elijo, San Diego, Calif. 92106
[22] Filed: May 29, 1975
[21] Appl. No.: 581,884

[52] U.S. Cl. ................................................ 43/55
[51] Int. Cl.² ....................................... A01K 97/04
[58] Field of Search ............ 43/55, 56, 11; 220/339

[56] References Cited
UNITED STATES PATENTS

| | | | |
|---|---|---|---|
| 1,554,797 | 9/1925 | LaBarre | 220/339 |
| 2,030,793 | 2/1936 | Horn | 43/55 |
| 2,208,861 | 7/1940 | Smith | 43/56 |
| 2,666,521 | 1/1954 | Milier et al. | 220/339 |
| 3,199,245 | 8/1965 | Wenting et al. | 43/55 |

Primary Examiner—Warner H. Camp
Attorney, Agent, or Firm—Knox & Knox

[57] ABSTRACT

A game bag assembly for divers which is of particular utility in the collection of lobsters and other crustaceans comprising a bag having side portions with a slick interior surface, a netted bottom portion, and an inwardly openable, preferably transparent trap door top.

1 Claim, 3 Drawing Figures

GAME BAG FOR DIVERS

BACKGROUND OF THE INVENTION

The invention pertains to container for underwater use by scuba and skin divers for collecting game procured during a dive.

Although several minnow traps and other related devices have been developed for various marine purposes, no game bag has been developed to adequately accommodate the specialized needs of those engaged in the relatively recently developed sport of scuba diving. Currently divers use net-bottomed bags or other makeshift containers of various construction, or simply return to a surface station with every catch.

Although various containers and bags are suitable for the collection of shellfish, speared fish, and other passive prey, crustaceans and other animals captured alive continue to vigorously struggle for freedom after capture and present a definite problem to the diver.

SUMMARY OF THE INVENTION

The present invention provides a means of convieniently collecting live, struggling prey, and comprises a bag with a netted bottom to promote the flow of water and smooth, slick sides separating the netted bottom from the framed trap-door top. Lobsters within the bag become entangled in the netted bottom and cannot climb the slick sides to the trap-door area, and thus additional game can be loaded into the bag without the necessity of grappling with the previous captured animals which are attempting escape.

The top of the bag is maintained open by the rigid frame, and the trap-door on the frame opens inwardly to dislodge any of the creatures which may have managed to scale the sides. The trap-door is hinged and biased into the closed position by surgical tubing and is preferably transparent.

DETAILED DESCRIPTION OF THE PREFERRED EMBODIMENT

The game bag assembly has a rigid frame 10 which may be made of wood or other suitable material and may, if desired, be made other than rectangular in shape.

Secured around the periphery of the frame is a flexible bag 12 which comprises an upper portion 14, which is smoothe and slick at least on its interior surface, and a lower, water permeable portion 16 which may be netting material, as shown. It is preferred that both portions be fabricated of nylon, dacron, or other synthetic material because of the obvious advantage they provide in superior strength and resistance to deterioration in an aqueous environment.

The netting may be sewn to the slick upper portion of the bag and the entire bag attached to the frame by stitching, as at 18, although glue, clamps, snaps, or any other securing means might be used instead.

Figure 1:
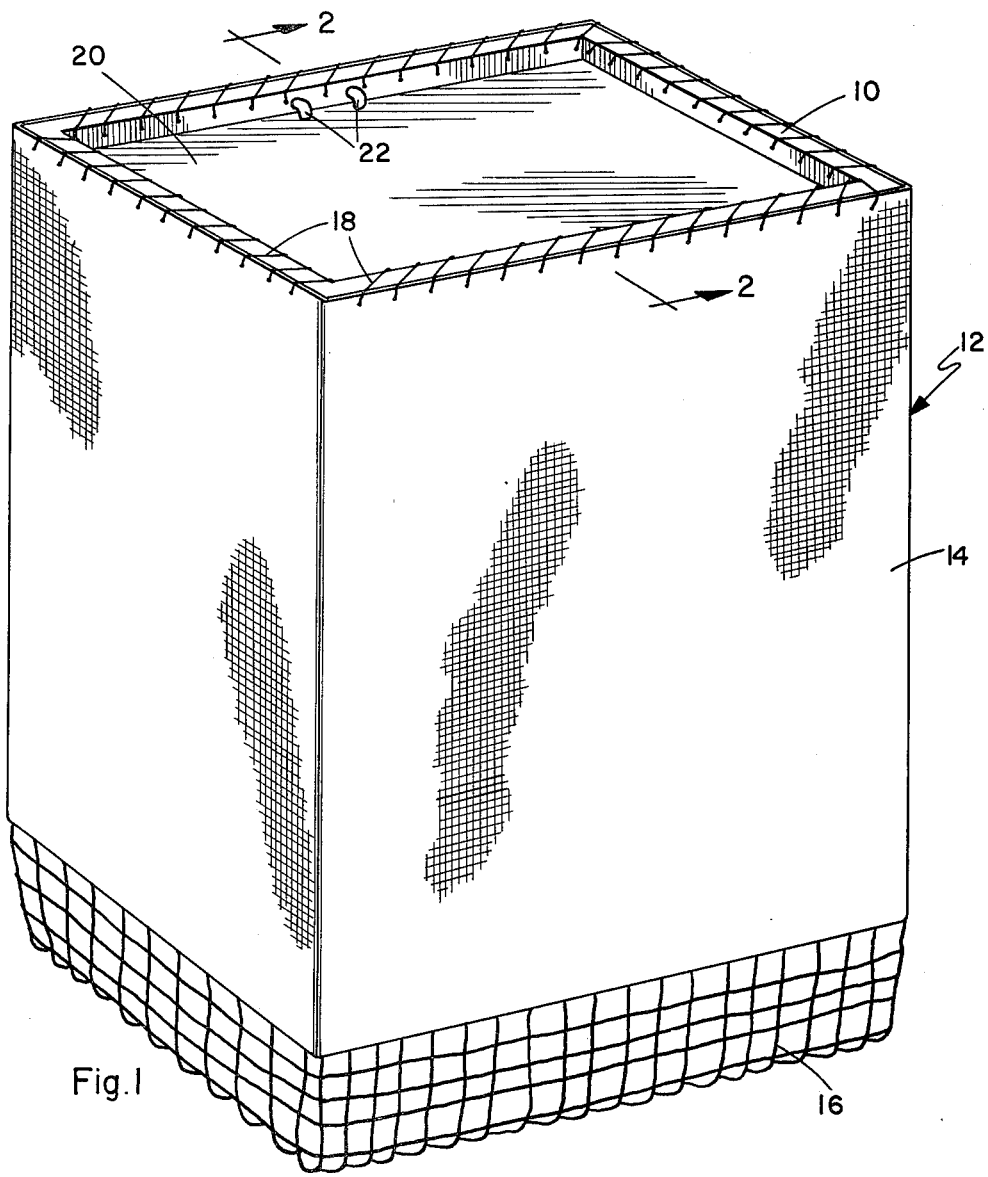
FIG. 1 is a perspective view of the game bag.
Figure 2:
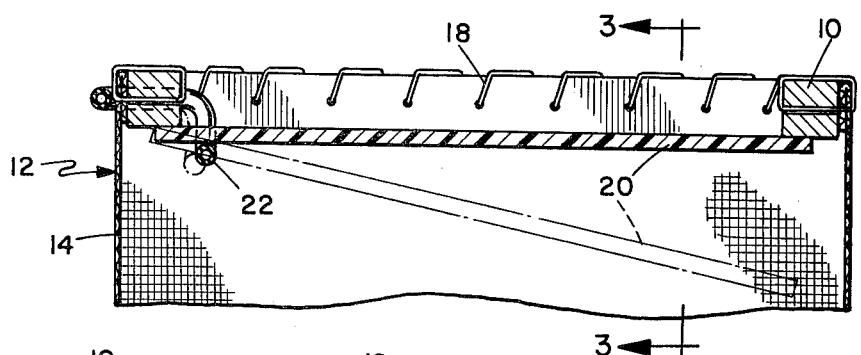
FIG. 2 is an enlarged sectional view taken on line 2—2 of FIG. 1.
Figure 3:
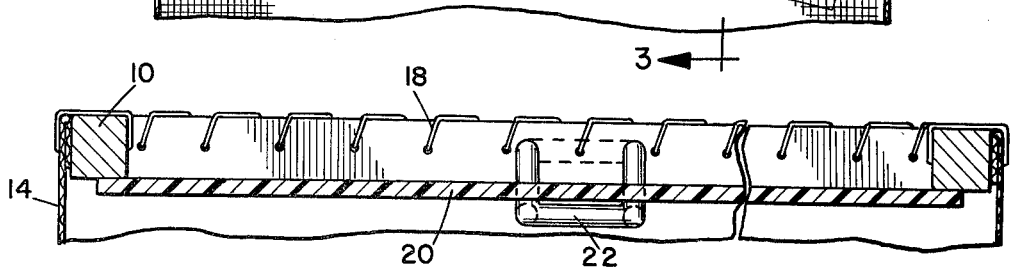
FIG. 3 is a sectional view taken on line 3—3 of FIG. 2.

As can be seen in FIG. 1, the frame provides the apparatus with a wide-mouthed opening that is almost as wide as the bag itself to facilitate loading of larger game. The frame is provided with a covering means for the opening in the form of a panel or trap-door 20 which is hinged to the frame and opens inwardly. Inasmuch as it is obviously desirable that the trap-door be biased into its closed position, it has been found that a length of surgical tubing 22 can be used to double as hinge and bias means when inserted through pairs of corresponding holes in the frame and trap-door as illustrated. The tubing, being cheap, easily installed and resistant to the corrosive action of sea water, is well suited in this capacity, though clearly a multitude of other structures and arrangements could be used with success.

It is desirable, though not essential, that the trap-door be transparent so that the user is able to determine the position of previously caught game prior to opening the door to minimize the possibility of escape. Common Plexiglass or other clear synthetics are well suited materials.

The net structure 16 is of utility in promoting the free flow of fresh, oxygen-rich water to the captive animals and allowing the enclosed volume of the bag to vary as well as permitting the trap-door to open inwardly without creating back pressure. Of course the primary advantage of the net is its ability to entangle and restrain lobsters and other prey.

I claim:
1. A game bag assembly for divers comprising;
   a. a rigid frame having an opening therein substantially as large as said frame;
   b. a transparent lid hinged to said frame and displaceable from a closed position covering said opening into an open position substantially within said bag;
   c. a flexible bag having a water-permeable bottom portion, a substantially continuous upper edge, and a water-impermeable, flexible, smooth portion constituting the major portion of the bag and extending to said edge to prevent the gripping of said bag by crustaceans contained therein;
   d. said bag being secured along its entire edge to said frame such that said bag, frame, and lid define a substantially closed chamber when said lid is closed;
   e. an elastic elongated member secured to and between said frame and said lid defining a hinge and biasing said lid into said closed position; and
   f. the entire assembly being adapted to be submersible.

* * * * *